United States Patent Office 3,347,964
Patented Oct. 17, 1967

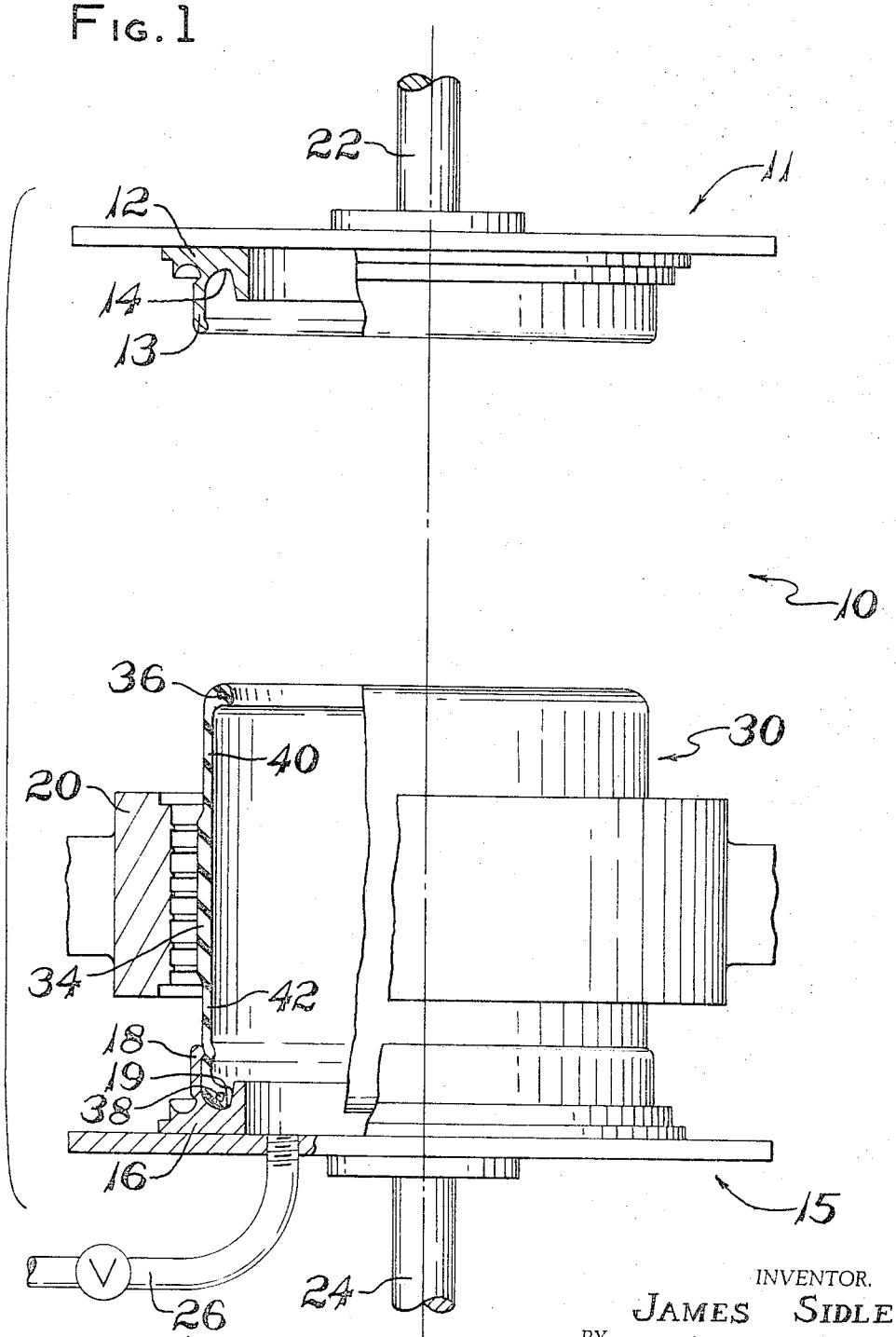

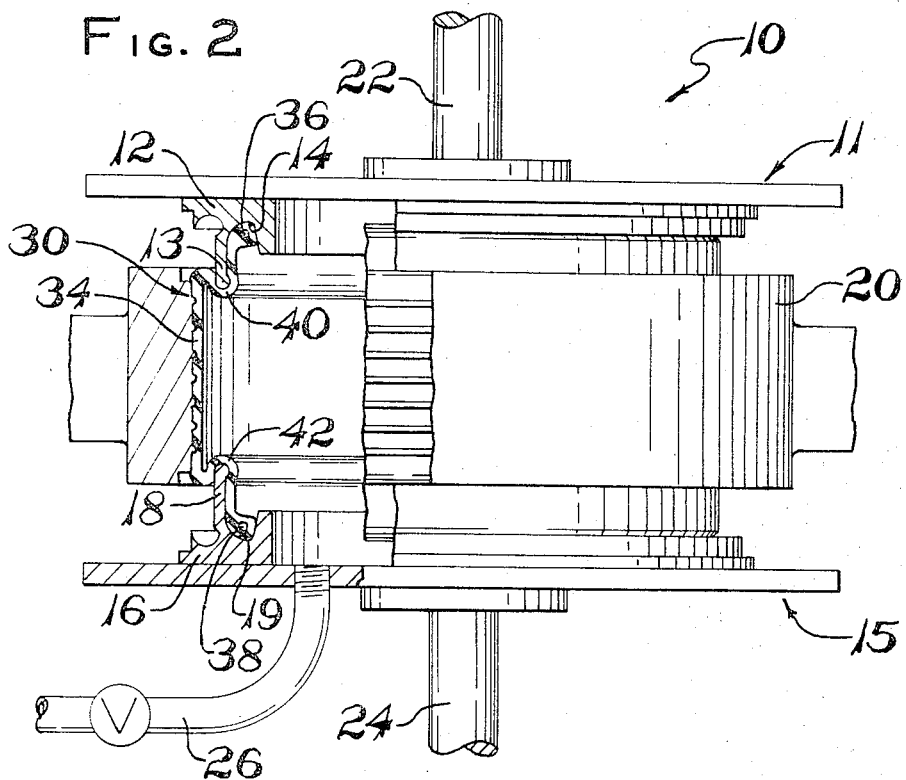
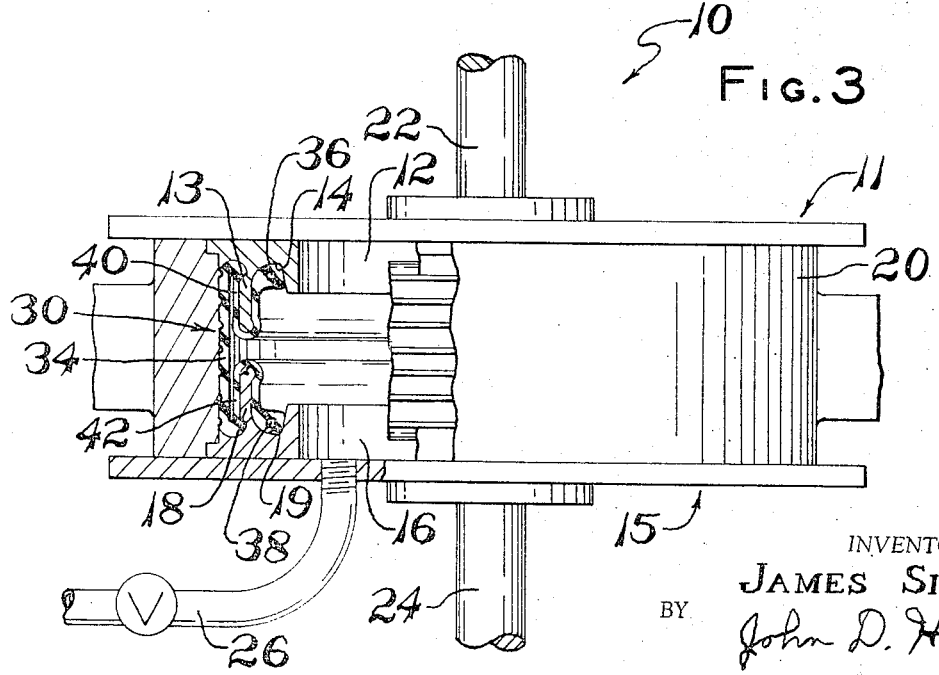

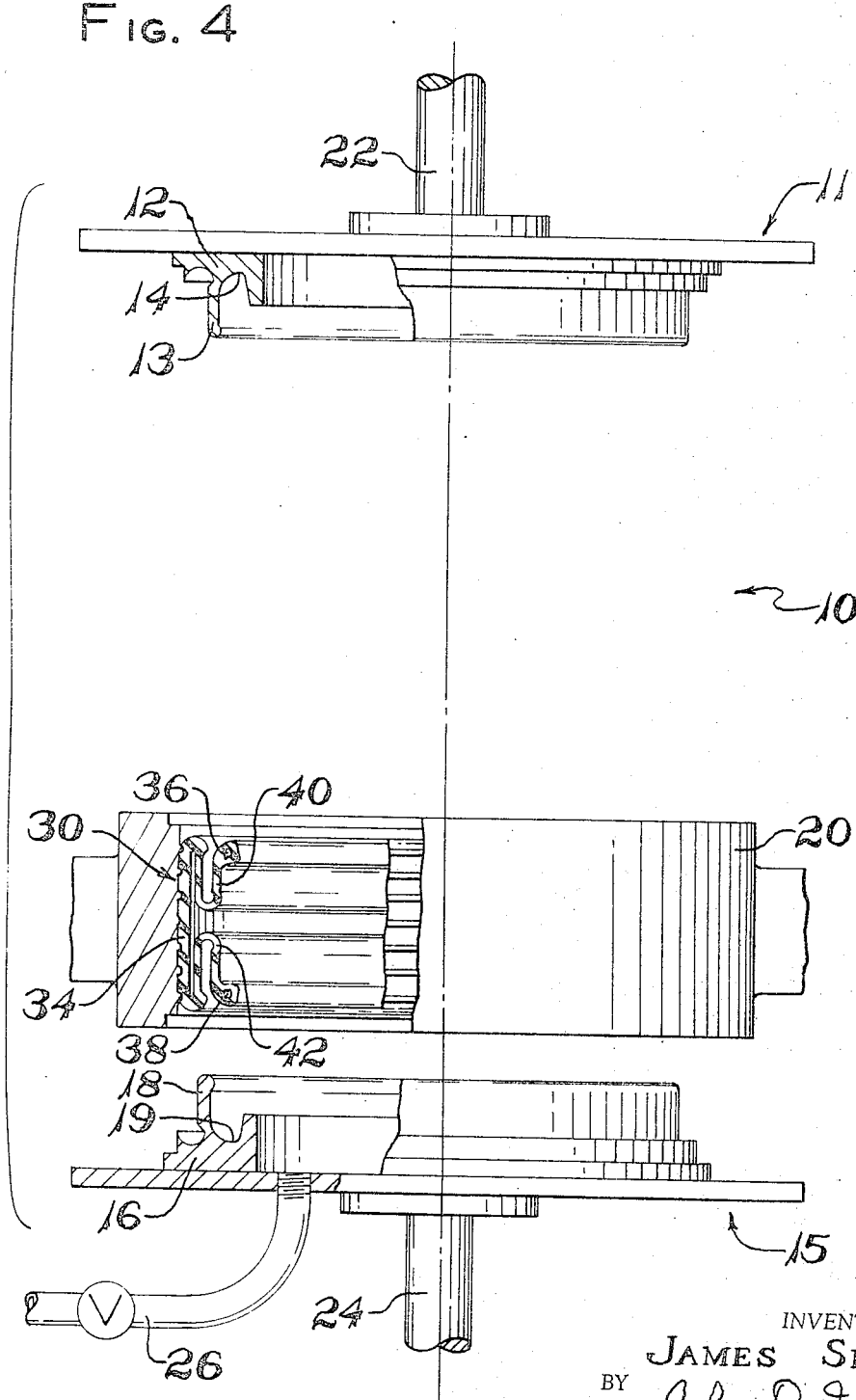

3,347,964
METHOD AND APPARATUS FOR MAKING
A PNEUMATIC TIRE
James Sidles, Cuyahoga Falls, Ohio, assignor to The
B. F. Goodrich Company, New York, N.Y., a corporation of New York
Filed Jan. 19, 1966, Ser. No. 521,671
11 Claims. (Cl. 264—94)

This invention relates to the manufacture of pneumatic tires and more particularly to a method and apparatus for molding a pneumatic tire with permanently set folds or creases so that the tire is expansible when inflated, and will resiliently collapse to a much smaller size when deflated. These so-called "expansible" tires are particularly useful as automobile spare tires in that they may be stored in their deflated condition in much less space than is required for conventional spare tires. They are also useful for aircraft landing gear because they can be deflated in flight to enable the tires to collapse to their smaller size for storage when the gear is retracted. These tires also have unexpectedly good "run flat" properties both on aircraft and on ground vehicles.

In one preferred form of expansible tire, the tire is molded with its opposing sidewall portions extending in annular reentrant folds directed axially towards each other. Conventional techniques using the usual two-piece shaping and molding apparatus are very difficult and impractical for making these new expansible tires, mainly because of the radically different molded shape of the expansible tires. That is to say, the conventional techniques have been developed for shaping and molding a tire which has substantially the same size in both its inflated and deflated condition. Therefore, these techniques provide for expanding the tread region of a green cylindrical tire carcass to a very much larger diameter than is permitted or desired in expansible tires. Moreover, even if present methods and apparatus were adapted to making expansible tires of this type, there is no apparent way that such methods would permit the molding of the expanisble tires to the optimum small size which provides their main advantage. And the cost to mold expansible tires following present techniques is estimated to be in the order of four or five times the cost of making conventional tires because of the additional steps and the complexity of the equipment required.

According to this invention expansible tires are made from the usual generally cylindrical-shaped green carcasses as these are built on existing "flat-band" tire carcass building machinery. This new method provides for supporting such a cylindrical carcass, and then progressively folding the sidewall regions on themselves axially of the carcass to a position concentrically inside the tread portion. Preferably this is accomplished with relatively small expansion of the tread region. Then the carcass, so folded, is cured so that the finished tire then has the desired sidewall folds as its "permanent" or natural shape when uninflated.

The preferred apparatus for carrying out this method includes a three-piece mold including a center tread-encircling piece and two end pieces which engage the bead regions of the cylindrical green tire carcass. Folding is effected by pressing the bead regions toward each other by axial movement of the mold end pieces, the sidewall regions being reversely deflected over rigid ring elements on the end piece as the beads are progressively displaced toward each other. Meanwhile, the tread-encircling piece limits the circumferential expansion of the tread region of the carcass. The folding action may be further assisted by pressurizing the interior of the carcass as the mold pieces are closed on the carcass. Preferably "bladderless" curing is used depending on the quality of the interior ply of the tire carcass, although very thin bladders could be used if desired.

The invention will be further described with reference to the accompanying drawings which illustrate successive steps in the method of this invention and one preferred form of apparatus for carrying out this method. In the drawings:

FIG. 1 is a schematic side elevation of the apparatus, partly in cross section and showing the first stage in the shaping and molding process when the green carcass is placed in the open mold apparatus;

FIG. 2 is a schematic view similar to FIG. 1 but showing the curing apparatus partially closed and the green tire carcass partially shaped therein;

FIG. 3 is a schematic view like FIG. 2 but showing the curing apparatus fully closed and the green tire carcass fully shaped therein;

FIG. 4 is another view similar to FIG. 1 but showing the curing apparatus returned to its fully opened position and the fully molded pneumatic tire before it is removed from the apparatus.

The curing apparatus 10 (shown only schematically in the drawings) includes an upper end mold plate 11 which has a bead-engaging ring 12, an annular rigid folding ring 13, and an annular bead seat 14. A lower end mold plate 15 is axially aligned with the upper mold plate 11 and, similarly, includes a bead engaging ring 16, an annular rigid folding ring 18, and an annular bead seat 19. The third main element of the apparatus 10 is a tread mold ring 20 which is supported rigidly as by fastening to the frame (not shown) of the curing apparatus 10 and is located between the upper and lower end mold plates 11, 15, respectively, and in axial alignment with them. The upper and lower end mold plates are axially movable towards each other from their spaced positions shown in FIG. 1 by pneumatic or hydraulic (water) rams 22 and 24, respectively, against the opposite annular margins of tread ring 20. The rams 22, 24 may be mechanically powered if desired.

A pipe 26 is attached to the lower end mold plate 15 at a location to communicate vulcanizing fluid or pressurized fluid into the interior region of a tire carcass 30 in the apparatus. Other pipes (not shown) may be attached to coring (not shown) through the mold parts in a manner well known in the art to conduct steam or other suitable curing medium to the mold parts for curing. Alternatively, the mold may be heated in an autoclave, by electric units, or in any other manner desired.

In operation, an open-end generally cylindrical or barrel-shaped green tire carcass 30, having a medial tread portion 34, annular beads 36 and 38, and spaced annular sidewall portions 40 and 42 on opposite sides of the medial tread portion 34 is positioned in the curing apparatus 10 with its bead 38 nesting in the bead seat 19 of lower end mold plate 15. When so positioned, the tread portion 34 of the carcass will be surrounded by tread mold ring 20 (FIG. 1).

The upper end mold plate 11 is then lowered from its position shown in FIG. 1 by ram 22 to bring its bead seat into engagement with bead 36 of tire carcass 30, thereby sealing the interior of the tire carcass. If pressure is to be used (and this is preferred), then at this stage a fluid pressure medium such as air, or steam, is introduced through pipe 26 into the interior of the tire carcass 30.

The combined effect of the internal pressure of the inflating medium and the mechanical axial force exerted on the carcass by the opposing end mold plates 11 and 15 expands the tread region 34 into engagement with the interior of tread ring 20 substantially as shown in FIG. 2. The mold parts are arranged so that the tread region 34 expands until its peripheral center registers with the peripheral center of ring 20. Thereafter the tread 34 is constrained by ring 20 from further expansion, and continued axial closure movement of plates 11 and 15 causes the sidewall portions 40 and 42 of carcass 30 to fold outwardly over their respective annular folding rings 13 and 18 substantially as shown in FIGS. 2 and 3. The closure movement of the end plates 11 and 15 is concluded when these plates engage the opposing sides of the fixed tread mold ring 20 as shown in FIG. 3. It is not essential for the end plates 11 and 15 to move synchronously, or even at the same rate. Regardless of their relative movement, each will each will eventually come to its closed position on ring 20 as shown in FIG. 3. At this point in the operation, the sidewall portions 40 and 42 are fully folded reversely over annular folding rings 13 and 18 and in this position, the tire carcass is now cured by suitable curing means. The tire may be cured by the use of steam introduced into the interior of carcass 30 through pipe 26, or by conductively heating carcass 30 by suitable heating equipment (not shown) in the mold pieces in accordance with the usual practice well known in the art.

After the carcass 30 is fully cured, the apparatus 10 is opened by retracting the upper and lower end mold plates 11 and 15 from ring 20 until they return to their initial positions as shown in FIGS. 1 and 4. The molded tire 30 normally remains attached to the mold ring 20 from which it is removable through the space between ring 20 and upper plate 11. The tire 30 retains its permanently cured folded shape as shown in FIG. 4 so long as it is deflated. On inflation the sidewalls unfold and the tread stretches circumferentially until the tire takes on the familiar toroidal shape of any common pneumatic tire. On subsequent deflation, the tire returns to its collapsed folded shape as shown in FIG. 4.

The folded regions of the sidewalls during the curing preferably do not touch the surrounding interior surface of the tread, and to prevent contact in this area the internal pressurizing fluid is very useful. Alternatively, the inside surfaces of the tire carcass may be dusted with soapstone or a similar medium to prevent these regions from adhering.

With respect to the actual curing or vulcanizing after the mold is closed, this may be in accordance with any of the well-known curing systems commonly known for making pneumatic tires. These systems vary with the chemical nature of the materials used for making the carcass. For example, curing or vulcanizing with heat is commonly used but air curing chemical means may be used if desired. Also curing with various forms of electromagnetic or sonic energy may be used within the scope of this invention.

What is claimed is:

1. A method of making a pneumatic tire comprising:
   (a) providing an annular green tire carcass of substantially cylindrical shape with coaxial bead portions at the opposing open ends of the carcass, a tread portion on the outside of the carcass, and sidewall portions extending from the tread portion to each bead portion;
   (b) folding one of the sidewall portions into a channel extending axially of the carcass and concentrically inside the tread portion;
   (c) constraining the tread portion of said green carcass during said folding to limit circumferential expansion of the tread to a diameter only slightly larger than the diameter of the bead portion of the folded sidewall and significantly smaller than the eventual inflated operating diameter of the tread portion; and
   (d) curing the carcass with said sidewall portion so folded and said tread portion so constrained to provide a permanently set fold in said sidewall extending circumferentially to the carcass in a continuous reentrant channel open to the outside surface of the sidewall.

2. The method defined in claim 1 in which said folding is effected by pressing said adjoining bead portion axially toward said tread portion.

3. The method defined in claim 2 which further includes pressurizing the interior of said tire carcass to expand said tread portion during said folding.

4. The method defined in claim 1 which further comprises folding said sidewall portion to a position concentrically inside the tread portion in which position the radially inner and outer regions of said folded sidewall are directed toward each other and merge at an annular apex having a diameter approximately equal to the diameter of the bead portion of the tire.

5. The method defined in claim 1 which further comprises folding the other of said sidewall portions in a similar manner.

6. The method defined in claim 5 which further comprises:
   (a) constraining said tread portion by positioning said green tire carcass inside a first mold part which encircles and is slightly larger in diameter than the tread portion of said green cylindrical carcass;
   (b) engaging the beads at opposite ends of the carcass with other mold parts to seal the interior of the carcass between the latter said mold parts;
   (c) folding said sidewalls by moving the latter said mold parts toward each other, thereby pressing both bead portions axially towards each other while maintaining said bead portions in said sealing engagement with the latter said mold parts; and
   (d) inflating the green tire carcass to circumferentially expand the tread portion of the tire carcass against said first mold part encircling the tread portion.

7. The method defined in claim 6 which further comprises:
   (a) progressively pressing areas of the sidewall portions against and reversely over an annular sidewall deflecting mold part while said beads are pressed toward each other thereby effecting said folding of said sidewall.

8. A method of making a pneumatic tire comprising:
   (a) providing an annular green tire carcass of substantially cylindrical shape with coaxial bead portions at the opposing open ends of the carcass, a tread portion on the outside of the carcass, and sidewall portions extending from the tread portion to each bead portion, the beads, tread, and sidewall portions being of approximately equal diameter in the green casing;
   (b) pressing said bead portions axially towards each other;
   (c) constraining the tread portion to limit its circumferential expansion to a diameter only slightly greater than the diameter of the bead portion but significantly smaller than the eventual inflated operating diameter of the tread portion;
   (d) pressing corresponding areas of each sidewall portion adjoining each said bead portion axially toward each other with the movement of the bead portion;
   (e) progressively deflecting each said sidewall portion into a reverse bend extending axially away from each other to fold each said sidewall portion into an annular reentrant fold open to the outside surface of the carcass; and
   (f) curing the carcass with said sidewall portions so folded and said tread portion so constrained to permanently set said reentrant fold in said sidewall portions.

9. A method of making a pneumatic tire comprising:
   (a) providing an annular green tire carcass of substantially cylindrical shape with coaxial bead portions at the opposing open ends of the carcass, a tread portion on the outside of the carcass, and sidewall portions between the tread portion and each bead portion, the bead, tread, and sidewall portions being of approximately equal diameter in the green casing;
   (b) inflating the carcass while it is in its substantially cylindrical shape to circumferentially expand the tread portion of the carcass;
   (c) constraining the tread portion to limit its circumferential expansion to a diameter only slightly greater than the diameter of the bead portions and significantly smaller than the eventual inflated operating diameter of the tread portion;

(d) pressing the opposing bead portions axially toward the tread portion thereby deflecting each said sidewall portion into a reverse bend extending axially away from each other to form in each sidewall portion an annular reentrant fold open to the outside surface of the carcass and with an annular apex and a diameter approximately equal to the bead diameter; and (e) curing the carcass with the tread portion so constrained and the sidewall portions so folded.

10. A method according to claim 9 wherein said sidewall portions are folded to a position concentrically inside the tread portion.

11. An apparatus for making a pneumatic tire comprising:

(a) means for supporting an annular green tire carcass of substantially cylindrical shape with coaxial bead portions at the opposing open ends of the carcass, a tread portion on the outside of the carcass, and sidewalls extending from the tread portion to each bead portion, said supporting means including oppositely facing end mold plates which are engageable with the opposing bead portions of the said green tire carcass, at least one of said end mold plates being movable toward and away from the other;

(b) means for folding said sidewall portion into a channel extending axially of the carcass and concentrically inside the tread portion comprising an annular rigid folding ring on each end mold plate which is engageable with the outside surfaces of the sidewall portions of the tire carcass adjoining the bead portion engaged by the ring and over which said sidewalls are deflected as said movable end mold plates are moved toward each other;

(c) means for moving at least one of said movable end mold plates toward and away from the other to effect said folding and subsequently to allow release of the cured casing;

(d) means positioned between said end mold plates for constraining the tread portion of said green tire carcass during said folding to limit circumferential expansion of the tread to a diameter only slightly larger than the diameter of the bead portions of said folded sidewalls but significantly smaller than the eventual inflated operating diameter of the tread portion comprising an annular rigid tread molding part for encircling the tread portion of said tread carcass and constraining circumferential expansion of said carcass; and (e) means on one of said mold plates for pressurizing said tire carcass to circumferentially expand said tread portion against said tread constraining means during said folding.

References Cited

UNITED STATES PATENTS

| Re. 15,518 | 1/1923 | Schwartz | 264—326 |
| 1,417,180 | 5/1922 | Kline | 264—326 |
| 3,276,930 | 10/1966 | Keefe | 264—326 |

FOREIGN PATENTS 480,444    5/1916    France.

ROBERT F. WHITE, *Primary Examiner.*

R. B. MOFFITT, *Assistant Examiner.*